(12) United States Patent
Saho et al.

(10) Patent No.: US 6,168,771 B1
(45) Date of Patent: Jan. 2, 2001

(54) SUPERCRITICAL OXIDATION PROCESS AND APPARATUS

(75) Inventors: Norihide Saho, Tsuchiura; Hisashi Isogami; Minoru Morita, both of Chiyoda-machi; Yoshiki Shibano, Hitachi, all of (JP)

(73) Assignee: Hitachi, Ltd., Tokyo (JP)

( * ) Notice: Under 35 U.S.C. 154(b), the term of this patent shall be extended for 0 days.

(21) Appl. No.: 09/024,315

(22) Filed: Feb. 17, 1998

(30) Foreign Application Priority Data

Feb. 19, 1997 (JP) .................................................. 9-035163

(51) Int. Cl.[7] .............................. B01J 8/00; B01D 47/00; A62D 3/00

(52) U.S. Cl. .................... 423/245.2; 423/210; 423/235; 423/238; 423/240 R; 423/242.1; 423/243.01; 423/245.1; 423/245.2; 588/200; 588/202; 588/203; 588/205; 588/206; 588/207; 588/215; 588/223; 588/224; 588/231; 588/236; 588/238; 588/242; 588/244; 588/246

(58) Field of Search .................................. 422/241, 242; 210/759, 761, 762; 423/245.2, 659, 210, 235, 238, 240 R, 242.1, 243.01, 245.1; 206/0.6, 0.7; 220/581, 585; 588/200, 202, 203, 205, 206, 207, 215, 218, 238, 242, 244, 246, 223, 224, 231, 236

(56) References Cited

U.S. PATENT DOCUMENTS

| | | | |
|---|---|---|---|
| 5,591,415 | * | 1/1997 | Dassel et al. .......................... 422/241 |
| 5,667,698 | * | 9/1997 | Whiting ................................. 210/761 |
| 5,804,066 | * | 9/1998 | Mueggenburg et al. ............. 210/177 |
| 5,837,149 | * | 11/1998 | Ross et al. ............................ 210/759 |

FOREIGN PATENT DOCUMENTS

75072 * 3/1983 (EP) ..................................... 422/242

* cited by examiner

Primary Examiner—Tom Dunn
Assistant Examiner—Eileen E. Nave
(74) Attorney, Agent, or Firm—Antonelli, Terry, Stout & Kraus, LLP

(57) ABSTRACT

Substances to be processed and a hydrogen peroxide aqueous solution are enclosed in a process vessel, and a the process vessel is enclosed in an autoclave together with water. Oxidation processing of the substances is performed by changing the state in the autoclave and the process vessel to a supercritical state which is realized by heating an outer wall of the autoclave with a heater. Further, even if the substances leak from the process vessel, by oxidizing the leaking substances in the autoclave the leaking of the substances to the outside of an oxidation processing apparatus is prevented.

17 Claims, 5 Drawing Sheets

SUPERCRITICAL OXIDATION PROCESS AND APPARATUS

BACKGROUND OF THE INVENTION

The present invention relates to an oxidation processing method of converting dangerous substances to be processed to highly safe waste by using an active oxidation reaction medium, such as high pressure and high temperature water in a supercritical state, and an apparatus and a reaction vessel for containing the substances to be processed, which use the method.

An example of a supercritical reaction processing apparatus applied to fluid extraction is disclosed in Japanese Patent Laid-Open 296662/1993.

In a supercritical oxidation processing apparatus using active oxidation of water at a supercritical state, an opening/closing type pressure vessel for generating a supercritical state (autoclave) is used as a process vessel. After substances to be processed are enclosed in the autoclave together with water or a hydrogen peroxide aqueous solution, the autoclave is sealed up tightly with flanges, and the temperature in the autoclave is increased by directly heating an outer wall of the autoclave with a heater. If the water or the hydrogen peroxide aqueous solution, in an amount adequate for the amount of enclosed substances to be processed, is enclosed in the autoclave, the internal pressure of the autoclave increases to more than 250 atm when the temperature in the autoclave is increased to the 600° C., and the organic material in the substances is oxidized within a short period of several minutes and is converted to a highly safe material, such as acid, nitrogen gas, carbon dioxide gas, salt, and so on. If the amount of oxygen is insufficient, oxidation is promoted by injecting oxygen into the autoclave at a higher pressure than the internal pressure of the autoclave.

However, one of the factors in a conventional supercritical oxidation processing is that if the substances to be processed are inflammable or if the toxic, or substances change to an inflammable or toxic material in the intermediate process on the way to a supercritical state or at a supercritical state, the danger of harming human beings could possibly occur in case of a leakage of the dangerous substances from the autoclave or occurrence of a fire in the oxidation processing apparatus. Since the temperature and the pressure in the autoclave highly increase to 600° C. and 250 atm, respectively, the leakage of substances to be processed, from the autoclave, can be caused by a sealing deficiency occurring at a joint of bolt clamping flanges using a metal packing as a sealing part, where a micro-crack may be generated in a wall of the autoclave by oxidization corrosion during operations, are break of the oxidation processing apparatus may be is brought by the earthquake, etc.,.

Furthermore, even if a power source of an electrical heater is turned off, the temperature of the electrical heater directly heating an autoclave does not decrease immediately. Therefore, it is possible for a part of the substances to be processed, which are leaking from the autoclave, to contact a surface of the electrical heater at a high temperature so that oxidation reaction of the substances progresses, causing the leaking substances to continue to change to flammable or toxic material, which may cause a fire at the processing apparatus or severe trouble to the health of an operator in the vicinity.

Further, a conventional supercritical pressure oxidation processing apparatus has the following problem. That is, since solid material (salt) tends to deposit on an inner wall of the autoclave, it is necessary to clean the inner wall every time after oxidation processing, which degrades the operational efficiency of the processing apparatus.

SUMMARY OF THE INVENTION

An object of the present invention is to provide an oxidation processing method and a processing apparatus using the method which are capable of preventing substances to be processed from leaking to the outside atmosphere.

Another object of the present invention is to provide an oxidation processing method and a processing apparatus using the method which do not cause a fire to occur at the processing apparatus or undesirably affect the health of an operator in the vicinity even if the substances to be processed leak from a process vessel.

Still another object of the present invention is to provide an oxidation processing method and a processing apparatus using the method which do not cause a fire to occur at the processing apparatus and protect an operator from the bad influence of a substances to be processed which may leak from a process vessel.

Yet another object of the present invention is to provide an oxidation processing method and a processing apparatus using the method which can make it easier to process solid substances separated on an inner wall of a process vessel and to improve the operational efficiency of the processing apparatus.

A further object of the present invention is to provide a process vessel which is adequate to perform oxidation processing of substances to be processed safely and efficiently.

The present invention provides a method of performing oxidation processing of substances to be processed by enclosing substances to be processed in a reaction vessel together with oxygen and a reaction medium, sealing up the reaction vessel, and heating the sealed-up reaction vessel to a high-temperature and high-pressure state, the method comprising the steps: of enclosing the substance to be processed in a first vessel (process vessel) together with oxygen and a first reaction medium and sealing up the first vessel; enclosing the sealed-up first vessel in a second vessel (pressure vessel=autoclave) together with a second reaction medium and sealing up the second vessel; and oxidizing the substances to be processed by changing the state inside the sealed-up first vessel to a high temperature and high pressure state, such as a supercritical state, by heating the sealed-up second vessel which indirectly heats the sealed-up first vessel; whereby the substance to be processed does not leak from the oxidation processing apparatus even if the substance to be processed leaks from the first vessel. Further, by performing the injection of the substance to be processed, oxygen and the first reaction medium into the first vessel, inside an isolation container, the substance to be processed is prevented from leaking to the air.

Also any substances to be processed which leak from the first vessel can be oxidized by heating the second reaction medium enclosed in the second vessel to a high temperature and high pressure. Oxidation processing of the leaking substance to be processed is positively promoted by injecting oxygen into the second vessel.

The second vessel covered with an insulation material that is absorbent so as to absorb the leaking substance to be processed, is contained in a protection container, and a pressure inside the protection container is decreased to a pressure less than atmospheric pressure, so that even if the substance to be processed leaks from the second vessel, the leaking substance does not leak from the oxidation processing apparatus.

The processed substances in the first vessel are discharged and abandoned by taking out the first vessel which was set into the second vessel and which was subjected to the heating process, and opening the first vessel.

By using a nozzle formed at the first vessel, the substance to be processed is enclosed into the first vessel together with oxygen and the first reaction medium, after which the first vessel is sealed up, and the first vessel is opened after the oxidation processing is finished, after which the processed substance is discharged.

Moreover, a hydrogen peroxide aqueous solution is used for generating oxygen and the first medium to be enclosed into the first vessel. In order to abandon sulfuric acid, hydrochloric acid, hydrofluoric acid, heavy metal (arsenic), etc., at stable forms, a material (for example, Zn) to react on hydrofluoric acid and change it to a stable material, ferrous salt to change heavy metal (for example, arsenic) to an iron eutectic alloy, or a neutralizer to neutralize acid such as sulfuric acid and hydrochloric acid, are enclosed into the first vessel together with the hydrogen peroxide aqueous solution.

Further, the first vessel is composed of a body of a large diameter, which is made of stainless steel, for containing substances to be processed, oxygen and the first reaction medium, and a nozzle of a small diameter, connected to the body. By using the nozzle, the substances to be processed, oxygen and the first medium, are injected into the first vessel, or the processed substances are discharged, and the first vessel is sealed up and opened.

In the above-mentioned oxidation processing method, and apparatus and process vessel using the method, by heating the outer wall of the second vessel with a heating means, the reaction medium in the second vessel is heated and the pressure in the second vessel is increased, and consequently, the heat added to the second medium transfers to the first vessel and heats the first vessel. At first, the first vessel is compressed by the pressure in the second vessel. However, since an oxidation reaction is caused in the first vessel, corresponding to an increase of the temperature in the first vessel, and the pressure in the first vessel also increases to a pressure nearly equal to that in the second vessel. Thus, only a difference between the pressure in the first vessel and that in the second vessel is applied to the first vessel, and the first vessel has only to possess a strength sufficient to prevent the first vessel from being broken by the pressure difference. Therefore, the first vessel can be composed by using a thin structure. From the view point of safety, it is desirable to keep the pressure in the second vessel higher than that in the first vessel.

In the heated first vessel, the state of the enclosed oxygen and first reaction medium (hydrogen peroxide aqueous solution) becomes a high-temperature and high-pressure state (in which supercritical water and oxygen are generated), and the substances to be processed are completely oxidized and changed to acid, nitrogen gas, dioxide carbon gas, salt, and so on,. Further, a part of the salt separates out on the inside wall of the first vessel. Although the second reaction medium in the second vessel is also at a high-temperature and high-pressure state, since oxygen is not enclosed in the second vessel, the inner wall of the second vessel is rapidly oxidized (corroded), and solid material such as salt does not separate. After the oxidation processing is finished, the heating is stopped. Further, the second vessel is opened and the first vessel is taken out after the temperature of the first and second vessels reach room temperature. Moreover, if necessary, a first vessel is newly set in the second vessel. Thus, since it is not necessary to clean the inside wall of the second vessel, the next operation mode can be immediately started, which improves the operational efficiency of the oxidation processing apparatus.

The reaction processing vessel has a double structure composed of the first and second vessels. Therefore, even if the first vessel breaks in a high-temperature and high-pressure state, and the processed substance leaks to the outside of the first vessel, since the second vessel is also at a high-temperature and high-pressure state, oxidization of the leaking substance is achieved by feeding oxygen into the second vessel. Thus, since the substance which has leaked from the first vessel is completely oxidized, no dangerous situation occurs.

Furthermore, even if the substances to be processed leak from the second vessel, the leaking substances are absorbed by the absorbent in the protection container (the third vessel), so that leaking of the substances from the third vessel does not occur.

Moreover, by enclosing substances to be processed into the first vessel, together with oxygen and the first reaction medium, inside a protection container, leakage of the substances from the first vessel to the air does not occur during the enclosing operations.

The first vessel taken out from the second vessel is opened, and the processed substances are discharged. The first vessel then may be thrown away.

Thus, it becomes possible to provide an oxidation processing method, and an apparatus and a process vessel using the method, whereby substance to be processed is prevented from leaking to the outside of an oxidation processing apparatus, and furthermore, the operational efficiency of the oxidation processing apparatus can be improved.

DETAILED DESCRIPTION OF THE EMBODIMENTS

Figure 1:
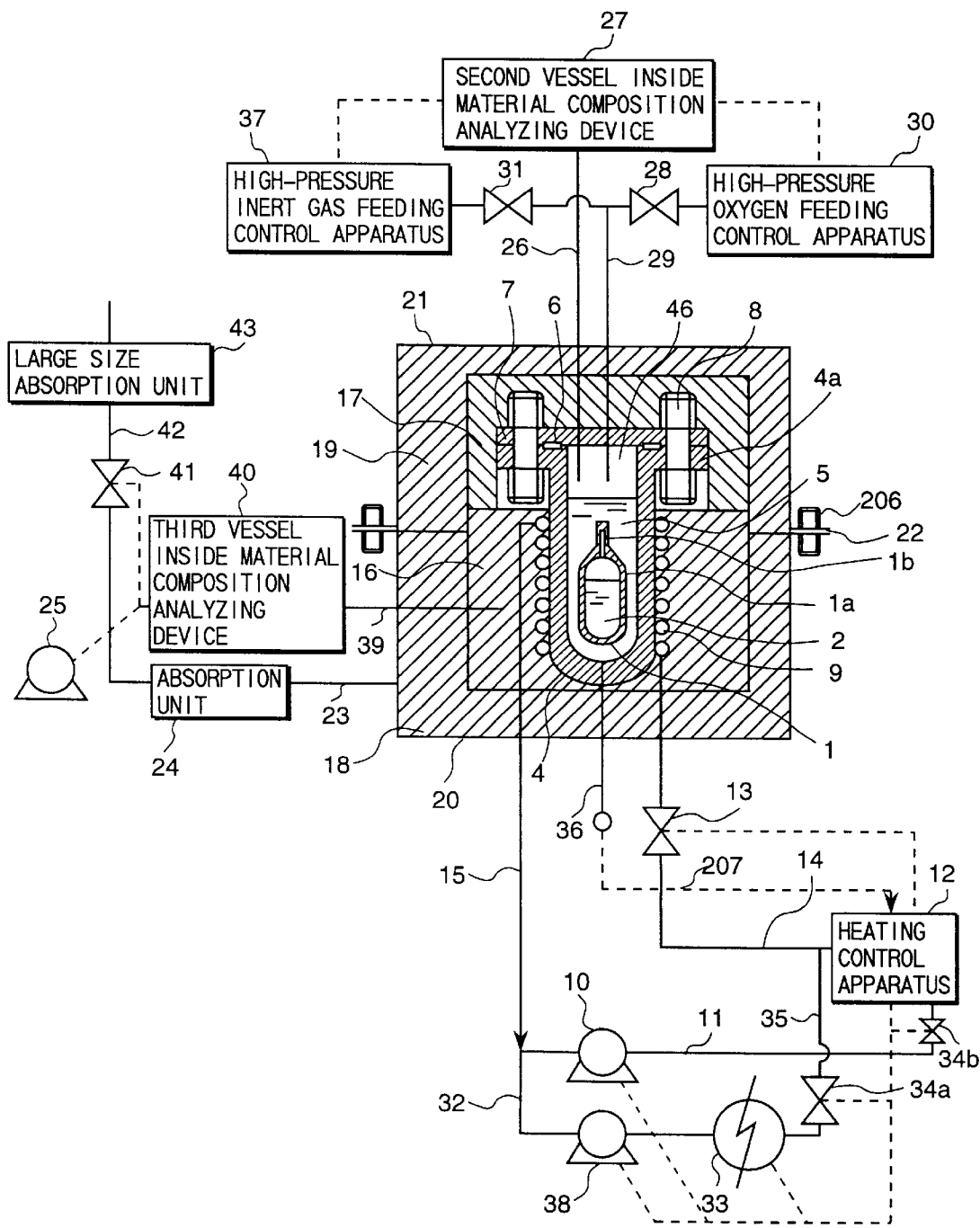
FIG. 1 is a vertical section of an oxidation processing apparatus according to the present invention.

Hereinafter, an embodiment according to the present invention will be explained with reference to the drawings. FIG. 1 is a block diagram showing a vertical cross-section of a reaction processing part in an oxidation processing apparatus according to the present invention, and a control system therefor.

The reaction processing part for performing oxidation processing of substances to be processed has a double structure including a first vessel used as a process vessel 1 and the second vessel in the form of an autoclave 4.

Figure 2:
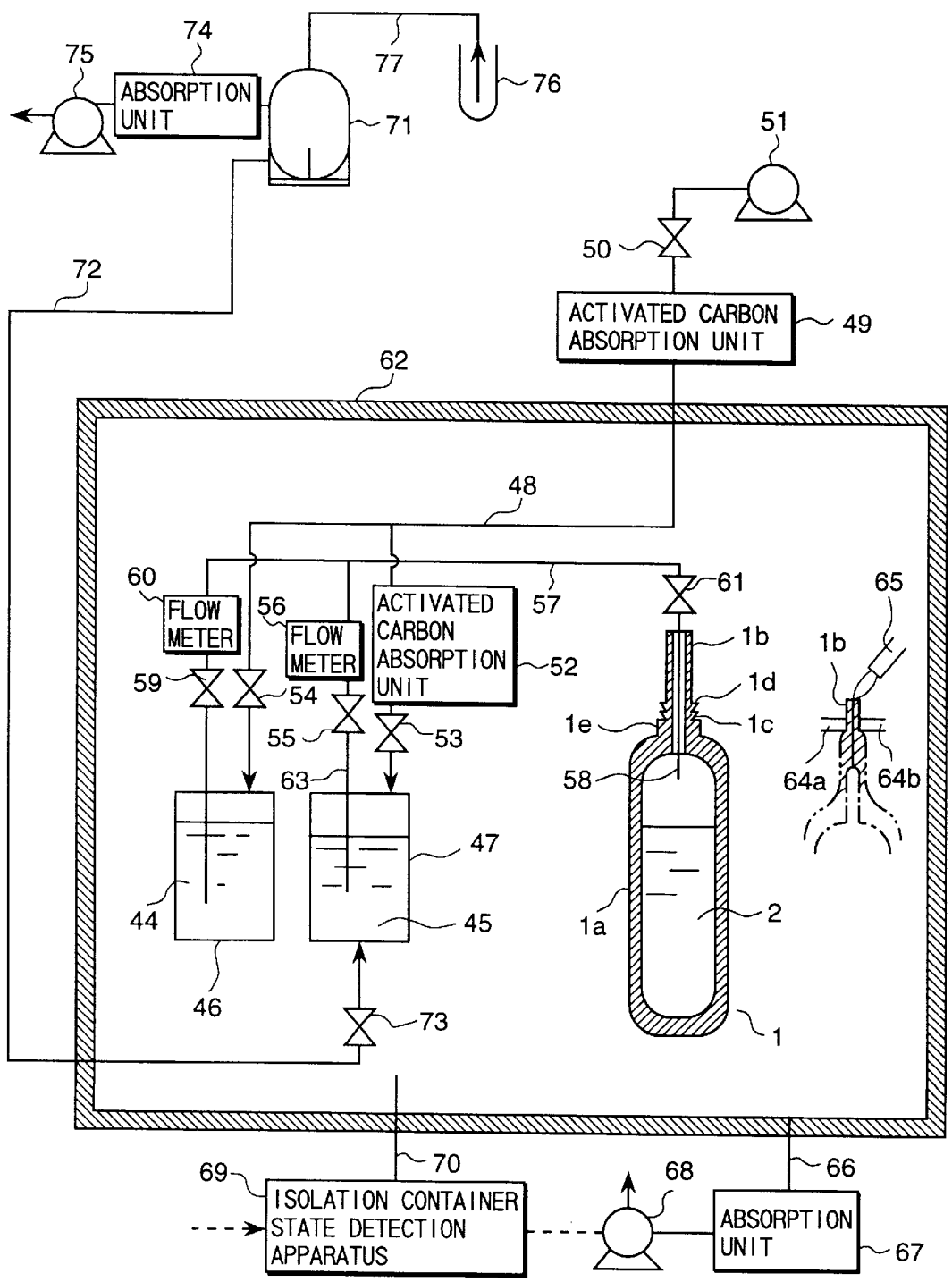
FIG. 2 is a block diagram for explaining processes of enclosing substances to be processed in an oxidation processing method according to the present invention.

A mixture 2 of substances to be processed and a predetermined amount of hydrogen peroxide aqueous solution is enclosed in the first vessel of the process vessel. Hydrogen peroxide aqueous solution corresponds to oxygen and the reaction medium for oxidizing the substances to be processed. The process vessel 1 is composed of a body portion 1a of large diameter, for containing the mixture 2 of the substances and hydrogen peroxide, and a nozzle portion 1b of small diameter, hermetically jointed to the body portion 1a by welding, which nozzle portion is used for injecting and discharging the mixture 2, and the vessel 1 is sealed up by crushing the top of the nozzle portion 1b and welding the crushed top with a welding torch. Moreover, as seen in FIG. 2 a connection screw part 1c used in connecting the process vessel 1 to a discharge apparatus, a seal stage part id, and a hexagonal surface le for applying an attachment and detachment tool to the process vessel 1, are formed at a peripheral surface wall of a base part of the nozzle portion 1b of the process vessel 1.

The second vessel formed by the autoclave 4 contains the first vessel and the second reaction medium in the form of water (pure water) and a pressure chamber (space) 4b is formed by sealing up a flange part 4a provided at an upper opening part of the autoclave 4 by tightening sealing flanges 7 with screws 8, and a seal member 6 such as a metal packing being inserted between the sealing flanges 7.

On an outside wall of the autoclave 4, a heating tube 9 for heat exchange, which forms a part of an indirect heating means, is tightly installed, and a heat transferring medium, such as oil, is fed in the heating tube 9 by a pump 10. The oil flows through a pipe 11 to a heating control apparatus 12 via a flow control valve 34, and is heated. Thus, the temperature of the oil is increased. Further, the oil is fed to the heating tube 9 through a pipe 14 via a valve 13. The oil fed to the heating tube 9 transfers its heat to the autoclave 4 to heat the autoclave 4, and returns to the pump 10 through a pipe 15.

As for the a peripheral surface wall, of the autoclave 4 its lower and upper parts are covered with heat-insulation material 16 and 17, respectively, and the outsides of the heat-insulation material 16 and 17 are further covered with absorbent material, such as activated carbon 18 and 19, respectively. Moreover, the outsides of the absorbent material 18 and 19 are covered by the lower part 20 and an upper part 21 of a third vessel representing a protection container. The lower and upper parts 20 and 21 are closely connected to each other hermetically by using flanges 22 and screws 206, and form a protection container for containing the autoclave 4, the heat insulation martial 16 and 17, and the absorbent material 18 and 19, hermetically.

To the lower part 20 of the protection container, an exhaust pipe 23, an absorption unit 24, in which absorbent material such as activated carbon is enclosed, and an exhaust pump 25, are connected. Further, the pressure in the protection container composed of the lower and upper parts 20 and 21 is controlled to be lower than atmospheric pressure so that gas and liquid in the protection container will not leak to the air.

A second vessel inside a material composition analyzing device 27, which includes a component analyzer, such as a gas-chromatography, unit a liquid-chromatography, unit etc., a pressure gauge and a thermometer, is connected to the autoclave 4 through a sample injection pipe 26 so that the material composition, such as leaking substances to be processed, the temperature and the pressure of gas or liquid existing in the autoclave 4 are always monitored. Moreover, a high-pressure oxygen feeding control apparatus 30 is connected to the autoclave 4 through a valve 28 and a injection pipe 29, and a high-pressure inert gas feeding control apparatus 37 is connected to the autoclave 4 through a valve 31 and an injection pipe 29. Further, the information detected by the material composition analyzing device 27 is sent to the high-pressure oxygen feeding control apparatus 30 and the high-pressure inert gas feeding control apparatus 37 as electrical signals, and if the substances to be processed are detected in the autoclave 4, a high-pressure oxygen gas is automatically fed into the autoclave 4, and an inert gas, such as nitrogen, is also fed according to the detected temperature and pressure. Since an inert gas is fed to keep the difference between the pressure in the process vessel 1 and that in the autoclave 4 (the pressure chamber 4b) at an adequate value, it is also possible to adjust the pressure difference by inputting an inert gas in advance.

In cooling the autoclave 4, a part of the circulated oil is cooled by passing it through a pipe 32 to a cooling apparatus 33 using a pump 38, and the autoclave 4 is cooled down by gradually decreasing the temperature in the heating tube 9 by mixing the cooled oil with the oil in a pipe 14 through a pipe 35 thereby adjusting the flow rate of the cooled oil to be mixed, by using a flow control valve 34a.

In controlling the temperature in the autoclave, the temperature in the wall of the autoclave 4 is measured by a thermometer 36, and a signal representing the measured temperature is transmitted to the heating control apparatus 12 via a cable 207. The heating control apparatus heats or cools the wall of the autoclave 4 by controlling the extent of heating of the oil, the discharge flow rates of the pumps 10 and 38, and the openings of the flow control valves 34a and 34b, etc., so that the temperature quickly follows a set target value.

The inside of the protection container composed of the upper and lower parts 20 and 21 is connected to a material composition analyzing device 40 for which a gas-chromatography or a liquid-chromatography unit is used so that components of gas or liquid existing inside the third vessel forming the protection container, that is, leaking substances to be processed, are always monitored. If the substances to be processed are detected, leaking substances to be processed are absorbed and collected by the absorption unit 24 and a large size absorption unit 43 by increasing the discharge flow rate of the exhaust pump 25, or by exhausting the leaking substances to the air through the large size absorption unit 43 via a safety valve 41 and a pipe 42.

In the following, the operation of the above-mentioned oxidation processing apparatus will be explained after setting after assembling the process vessel 1, the autoclave 4, and the protection container composed of the upper part 20 and the lower part 21, oil is circulated by operating the pump 10, and the oil is heated by a heater, for example, an electrical heater, in the heating control apparatus 12. The oil of which the temperature is increased is fed to the heating tube 9, and the autoclave 4 is further heated. When water in the autoclave 4 is heated and the temperature of the water is increased, the heat of the heated water is transferred to the process vessel 1, and so the inside of the process vessel 1 is also heated, which increases the temperature and pressure in the liquid mixture 2 consisting of the substances to be processed and the hydrogen peroxide aqueous solution.

In the above-mentioned embodiment, although the second reaction medium in the autoclave 4 is heated by the heating tube 9 provided closely to the outer surface of the autoclave 4, it is possible to heat the second reaction medium directly by using a heater provided in the second reaction medium or a high-frequency heating means.

The pressure in the autoclave 4 acts on the process vessel 1 so as to compress the vessel 1, and since oxidization reaction starts in the process vessel 1, corresponding to the increase in the temperature inside the process vessel 1, the pressure in the process vessel 1 also increases. Further, since only the pressure difference is applied to the process vessel 1, and the process vessel 1 has only to have a strength sufficient to prevent the vessel 1 from breaking in response to the pressure difference, a comparatively thin structure can be used. From the view point of safety, it is desirable to keep the pressure in the process vessel 1 a little lower than that in the autoclave 4.

If processing of the substances to be processed causes a great increase of the pressure in the process vessel 1, due to oxidization reaction etc., it is possible to reduce the difference between the pressure in the process vessel 1 and that in the autoclave 4 by injecting inert gas, such as nitrogen gas, into the autoclave 4 from the high-pressure inert gas feeding control apparatus 37 in advance and by making use of an increase of the partial pressure, corresponding to the temperature in the autoclave 4. It is also possible to perform a control which automatically injects inert gas from the high-pressure inert gas feeding control apparatus 37, based on the pressure or the temperature detected by the second material composition analyzing device 27.

By continuing to heat the autoclave 4, the water 5 enclosed in the autoclave 4 reaches a high-temperature and high-pressure (supercritical) state. Further, the temperature and pressure of the hydrogen peroxide aqueous solution enclosed in the process vessel 1 become high, and the enclosed hydrogen peroxide aqueous solution generates oxygen and supercritical water. Thus, the substances to be processed are completely oxidized and change to acid, nitrogen gas, carbon dioxide gas, salt, and so on. Moreover, a part of the salt is deposited on the inner wall of the process vessel 1. Since oxygen is not fed into the autoclave 4 in high-pressure and high-temperature (supercritical) state, the inner wall of the autoclave 4 is not rapidly oxidized, namely, eroded, and solid material does not separate.

Furthermore, since the whole process vessel 1 is contained in the autoclave 4 in a supercritical state and is heated by the autoclave 4, the nozzle portion 1b of the process vessel 1 also reaches a high-temperature and high-pressure (supercritical) state. Consequently, the substances to be processed, which have not yet, do not reacted remain in the process vessel 1, and all the substances to be processed can be completely oxidized.

Although carbon dioxide is generated gas in an oxidization reaction if the substances to be processed contain organic material, since the saturation pressure of carbon dioxide gas is 40–50 atm at room temperature, the partial pressure of carbon dioxide gas does not exceed the range of 40–50 atm in the process vessel 1, which is cooled to room temperature after the finish of the oxidation processing and is taken out from the autoclave 4. Therefore, the process vessel 1 can be composed by using a comparatively thin structure. Furthermore, by enclosing a predetermined amount of gas phase material in the process vessel 1 in advance, the partial pressure of reaction products (gas) can be adjusted to a predetermined value.

In a conventional autoclave 4, since its inner wall is rapidly oxidized, that is, eroded, it is necessary to produce the autoclave 4 by using a material having a high corrosive resistance, for example, an expensive material, such as income. On the other hand, in the autoclave 4 of the oxidation processing apparatus according to the present invention, since there is little corrosion of its inner wall, the autoclave 4 can be produced by using a cheap material, such as stainless steel. Moreover, a used process vessel 1 can be thrown away and a new process vessel 1 used in every oxidation processing, since the amount of corrosion at the inner wall is very little, making it unnecessary to produce a process vessel by using an expensive material, such as income, with the result that a disposable process vessel can be produced using cheap material, such as stainless steel.

After the finish of the oxidation processing, heating of the oil, which is performed by the heating control apparatus 12, is stopped, and the temperature in the heating tube 9 is gradually decreased by mixing a part of the circulating oil which is cooled by the cooling apparatus 33 into oil in the pipe 14 via the pipe 35 while adjusting the flow rate of the cooled oil to be mixed by using the flow control valve 34a. After the temperature in the process vessel 1 in the autoclave 4 is decreased to room temperature, the flanges 22 are released, and the upper part 21, the absorbent material 19 and the heat insulation material 17, which compose a part of the protection container, are removed. Further, the flanges 7 of the autoclave 4 are released, and the used process vessel 1 is taken out. Furthermore, a new process vessel 1 for processing the next substances to be processed is set.

Since it is not necessary to clean the inside of the autoclave 4, a new process vessel 1 can be immediately set after the operation of the oxidation processing apparatus is finished, and the next operation of the oxidation processing apparatus can be quickly started, which improves the operational efficiency of the apparatus.

If the process vessel 1 breaks and substances to be processed, which are not processed yet, leak to the outside of the process vessel 1 (to the inside of the autoclave 4.) which is operated at a high-temperature and high-pressure (supercritical) state, the material composition analyzing device 27 for the second vessel detects the substances to be processed, and oxygen for oxidization is injected into supercritical water in the autoclave 4 from the high-pressure oxygen gas feeding control apparatus 30. Thus, the leaking material (substances to be processed) is completely oxidized and becomes material having a very low danger level.

Further, if substances to be processed, which are not processed yet, leak from the autoclave 4, the leaking substances are absorbed by the absorbent 19 in the protection container, covering the autoclave 4, and do not leak to the outside of the protection container composed of the upper part 20 and the lower part 21. When the amount of the substances leaking into the protection container is much, the discharge flow of the pump 25 is increased, or the leaking substances are also absorbed by the large size absorption unit 43 by exhausting the leaking substances through the safety valve 41, the pipe 42 and the large size absorption unit 43, to the air. Thus, it is possible that, when the protection container breaks, substances to be processed, which are not processed yet, are prevented from leaking to the air.

As mentioned above, in accordance with the embodiment, since substances to be processed are heated and processed in a doubly isolated structure, it is possible to prevent substances to be processed, which are not processed yet, from leaking to the outside of the processing apparatus. Further, it is possible to provide an oxidation processing method and an apparatus using the method which improve the operational efficiency.

The above-mentioned embodiment can be applied to oxidation processing of general organic material, especially to processing of such kinds of toxic gas solution, solutions as shown in Table 1. The solution includes compounds of carbon, hydrogen, chlorine, sulfur, arsenic, nitrogen, phosphorus, oxygen, and fluorine, and the compounds can be decomposed to nitrogen gas, dioxide carbon gas, water, hydrochloric acid, sulfuric acid, phosphoric acid, and hydrofluoric acid. On the other hand, arsenic remains as a solid material.

TABLE 1

Toxic gas in a liquid state at a room temperature

| Classification | Name and Symbol | Molecular formula |
| --- | --- | --- |
| Vesicant | Mustard gas (Yperite) HD | $(CH_2.CH_2Cl)_2S$ |
|  | Lewisite L | $Cl_2CH=CHAsCl_2$ |
| Nerve gas | Tabun GA | $(CH_3)_2N-\overset{CN}{\underset{\parallel}{P}}-O-C_2H_5$ $\phantom{(CH_3)_2N-P}O$ |
|  | Sarin GB | $CH_3-\overset{CN}{\underset{\parallel}{P}}-O-C_3H_7$ $\phantom{CH_3-P}O$ |
|  | Soman GD | $CH_3-\overset{CN}{\underset{\parallel}{P}}-O-C_6H_{13}$ $\phantom{CH_3-P}O$ |
| Blood gas | Prussic AC | HCN |

Reaction formula for lewisite including arsenic $Cl_2CH=CHAsCl_2 + 3H_2O_2 = 4HCl + 2CO_2 + 2H_2O + As$
   1 mole       3 moles      2 moles $2CO_2$   If a vacant space of 1 L exist in a sealed-up vessel before oxidation processing, the partial pressure of the dioxide carbon gas is 44.8 atm at a room temperature. Since the liquefaction pressure is 40–50 atm, the pressure does not increase beyond 44.8 atm.

As   After changing the arsenic to iron eutectic alloy, the iron-arsenic eutectic is withdrawn by a magnetic separation method.

After the finish of the oxidation processing, the substances which are changed to liquid and gas are discharged from the process vessel 1, and arsenic in a solid state is changed to an iron eutectic alloy which can be separated in a stable state and withdrawn. Further, the fixing of hydrofluoric acid can be performed by making hydrofluoric acid react on more easily corroding metal such as Zn than material used to compose the process vessel, and it can be realized by mixing a powder of Zn into a hydrogen peroxide aqueous solution and enclosing the mixture in the process vessel in advance.

In the following, a method of enclosing the substances to be processed and the hydrogen peroxide aqueous solution into the process vessel 1 will be explained. FIG. 2 is a block diagram for explaining processes for enclosing the liquid substances 45 to be processed and the hydrogen peroxide aqueous solution 44 into the process vessel 1, followed by sealing up of the process vessel 1.

The hydrogen peroxide aqueous solution 44 and the substances 45 to be processed are contained in a hydrogen peroxide aqueous solution container 46 and a container 47, respectively. Into the containers 46 and 47 an, inert gas, such as nitrogen gas compressed by a gas pressurizing pump or cylinder 51, is fed through a pipe 48, via an activated carbon absorption unit 49 and valve 50. Further, an activated carbon absorption unit 52 and a valve 54 are interposed in a path to the container 47 for substances to be processed, and a valve 53 is interposed in a path to the hydrogen peroxide aqueous solution container 46.

Injecting the hydrogen peroxide aqueous solution 44 and the substances 45 to be processed into the process vessel 1 is performed by inserting an injection nozzle 58, provided at the top of a pipe 57 in which a valve 61 is installed, into the nozzle portion 1b. A base end of the pipe 57 at which a valve 59 and a flow meter are installed is immersed in the hydrogen peroxide aqueous solution 44 contained in the container 46. Further, one end of a pipe 63 for feeding the substances 45 to be processed is immersed in the substances 45 to be processed contained in the container 47, and the other end of pipe 63 is connected to an intermediate position (between the flow meter 60 and a valve 61) of the pipe 57 via a flow meter 56.

Injecting the hydrogen peroxide aqueous solution 44 and the substances 45 to be processed into the process vessel 1 and sealing-up of the process vessel 1 are performed inside a prepared isolation container 62 (airtight room) which can be closed hermetically. The isolation container 62 includes a door (not shown in the figure) used for putting in and taking out the process vessel 1, a sealing-up means for sealing up the top of the nozzle portion 1b of the process vessel 1 into which the hydrogen peroxide aqueous solution 44 and the substances 45 to be processed were injected by crushing and welding the top part inside the isolation container 62, and an isolation container exhaust means including an absorption unit for preventing any substances 45 to be processed, which may be leaking to the inside of the isolation container 62, from leaking to the outside of the isolation container 62.

Using the sealing-up means, the injection nozzle 58 provided at the end of the pipe 57 is pulled out from the process vessel 1 into which the hydrogen peroxide aqueous solution 44 and the substances 45 to be processed were injected, and the top of the nozzle portion 1b is strongly clamped and crushed by clamping members 64a and 64b. Further, the crushed top is sealed up by heating and welding the crushed top with a welding torch 65. For this purpose, it is desirable for the clamping members 64a and 64b to be made of a material having a high heat conductivity in order to prevent the heat of welding from being conducted to the body portion 1a of the process vessel 1, to prevent the temperature of the body portion 1a, from increasing which would further increase the pressure in the process vessel 1, coursing, pin holes to be formed in the welded top.

Moreover, the isolation container exhaust means has an exhaust pipe 66, an absorption unit 67, an exhaust pump 68, and an isolation container state detection apparatus 69, for controlling the pressure in the isolation container 62 so that the pressure is kept lower than atmospheric pressure in order to prevent gas and liquid in the isolation container 62 from leaking to the air. The isolation container state detection apparatus 69 analyzes material which is taken in from the inside of the isolation container 62 through a sample suction pipe 70 by using a composition analyzer, such as a gas-chromatography or a liquid-chromatography unit. If gas or liquid substances to be processed, are leaking into the isolation container 62, this will be detected, and the isolation container state detection apparatus 69 will then exhaust the inside of the isolation container 62 by operating the exhaust pump 68 to collect the leaking substances to be processed with the absorption unit 67. Further, if the door is opened, which is detected by the isolation container state detection apparatus 69, the pressure in the isolation container 62 is reduced by operating the exhaust pump 68 in order to prevent dangerous material in the isolation container 62 from leaking to the outside air.

Injection of the substances 45 to be processed into the container 47 is performed by transferring the substances 45 from an extraction vessel 71 of liquid substances to be processed through pipes 72 and 73. The inside of the extraction vessel 71 of liquid substances to be processed is exhausted by an exhaust pump 75 through an absorption unit 74 to maintain the inside of the extraction vessel 71 in a low pressure state. Further, the substances 45 to be processed which remain in waste unit 76 are sucked with an extraction pipe 77 and taken into the extraction vessel 71.

The door of the isolation container 62 is opened, and the process vessel 1 is set in the isolation container 62. After the door is closed, the process vessel 1 is transported and the injection nozzle 58 provided at the top of the pipe 57 is inserted into the nozzle portion 1b, using remote operations or an automatic work mechanism. Further, by injecting inert gas into the container 47 to increase the pressure in the container for substances 45 to be processed, a predetermined amount of the substances 45, such as a toxic gas solution to be processed, is injected into the process vessel 1 from the injection nozzle 58 provided at the end of the pipe 57, which is inserted into the nozzle portion 1b, through the valve 55 and the valve 61 via the flow meter 56. Moreover, by injecting inert gas into the hydrogen peroxide aqueous solution container 46 to pressurize the inside of the container 46, a predetermined amount of the hydrogen peroxide aqueous solution 44 is injected into the process vessel 1 from the injection nozzle 58 provided at the end of the pipe 57, which is inserted into the nozzle portion 1b, through the valve 59 and the valve 61 via the flow meter 60. The injected hydrogen peroxide aqueous solution 44 being injected operates to clean the insides of the pipe 57, the valve 61 and the injection nozzle 58, the insides being contaminated with the substances 45 to be processed. After the substance 45 to be processed and the hydrogen peroxide aqueous solution 44 are injected into the process vessel 1, the injection nozzle 58 provided at the end of the pipe 57 is pulled out from the process vessel 1, the top part of the nozzle portion 1b is crushed by clamping members 64a and 64b, and then the process vessel 1 is sealed up by heating and welding the crushed top using a welding torch 65.

Safety is maintained turning the injection of substances and the sealing of the vessel by performing these operations using remote control or an automatic work mechanism located inside the isolation container 62 so as to be isolated from outside air. The absorption units 49 and 52 prevent the substances to be processed from leaking to the outside air by absorbing any leaking substances 45, even if the substances to be processed flow reversely in a direction toward the outside.

The door of the isolation container 62 is opened, and the process vessel 1 into which the hydrogen peroxide aqueous solution 44 and the substances to be processed were injected is taken out from the isolation container 62 after processing thereof is completed.

Figure 3:
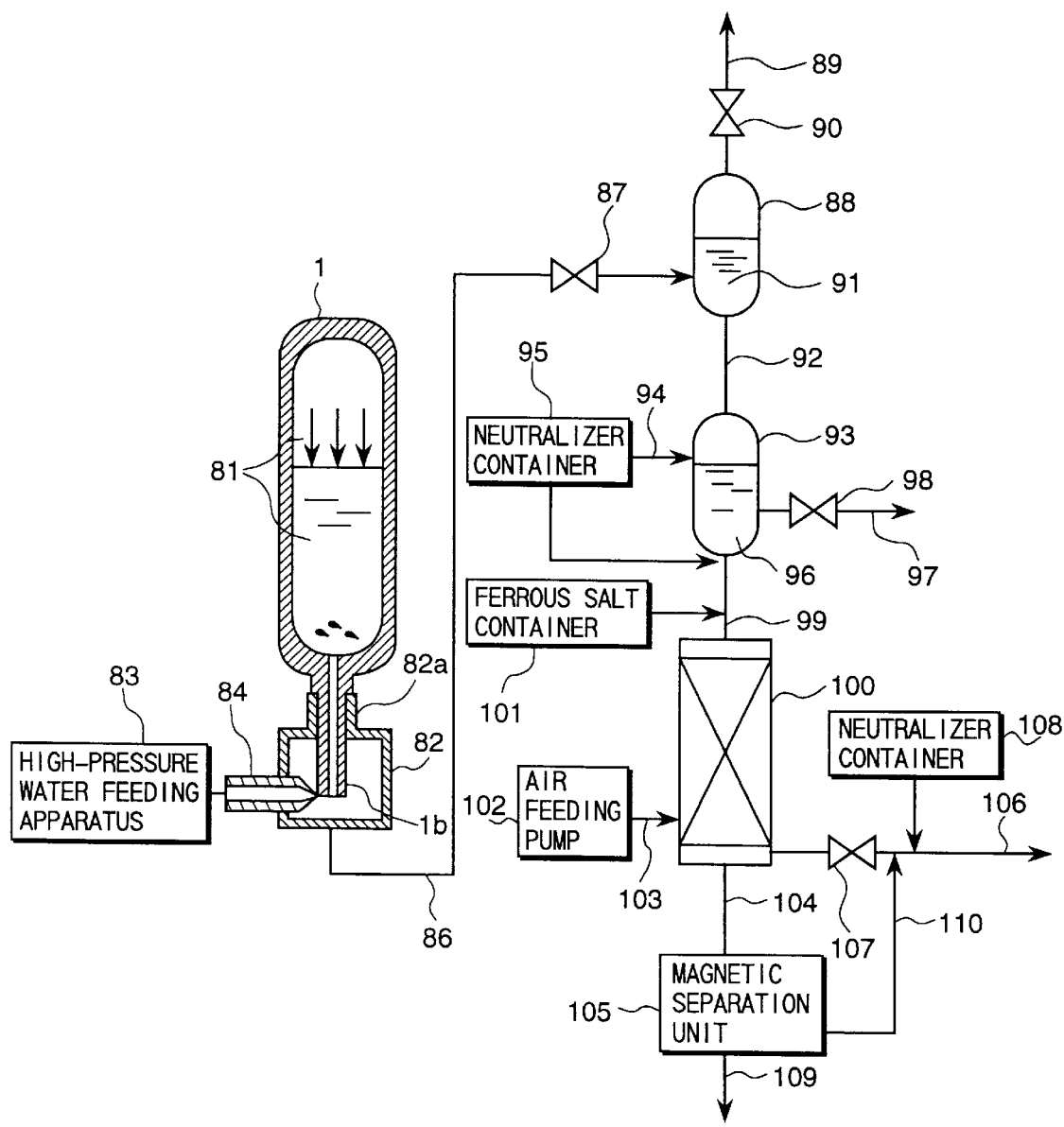
FIG. 3 is a block diagram for explaining processes of abandoning substances an which oxidation processing was performed, in the oxidation processing method according to the present invention.
Figure 4:
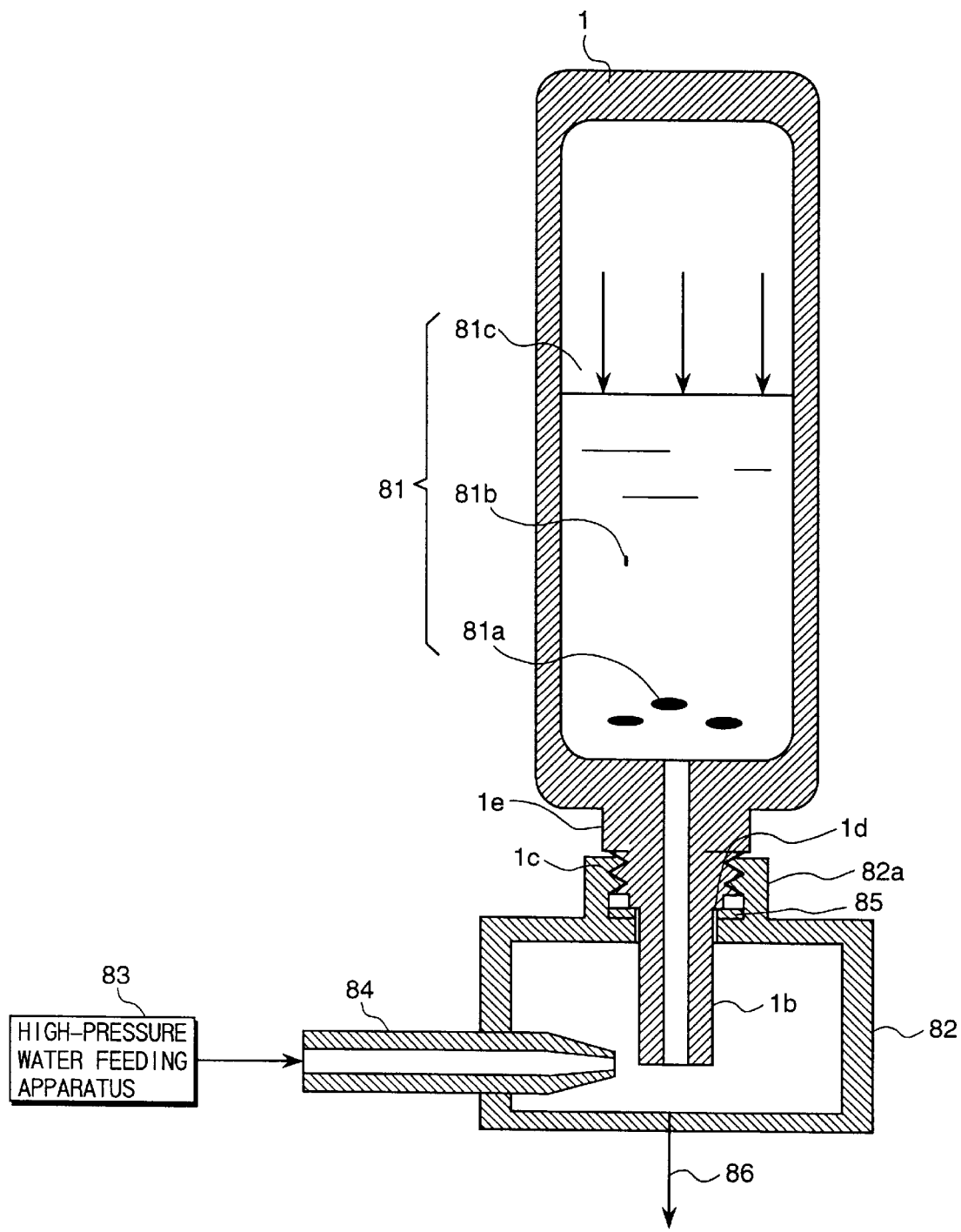
FIG. 4 is an enlarged vertical section of an opening part in the block diagram shown in FIG. 3, for opening a process vessel.

In the following, a method of withdrawing the substances for which the oxidation processing is finished will be explained. FIG. 3 is a block diagram of an apparatus for processing the processed substances 81 on which the oxidation processing was performed by using supercritical water, and FIG. 4 is an enlarged vertical section of a seal opening part for opening the sealed-up process vessel 1.

The process vessel 1 in which oxidation processing of the substances is finished contains gas 81c, such as carbon dioxide gas, nitrogen gas, etc., liquid 81b, such as sulfuric acid, hydrochloric acid, phosphoric acid, hydrofluoric acid, etc., and solid material 81a, such as arsenic. In the process vessel 1 in which Zn powder is mixed, hydrofluoric acid reacts on the Zn and changes it to a stable compound. The process vessel 1 is hermetically set up at an opening unit 82 by directing the nozzle portion 1b downward and inserting the top part of the nozzle portion 1b into the seal opening unit 82. Further, the top part is opened inside of the opening unit 82 by cutting the top part, for example, using a water cutter which jets a high-pressure water fed by a high-pressure water stream feeding apparatus 83 from a cutter nozzle 84.

The seal opening unit 82 has a socket part 82a which screws into the connection screw part 1c, formed at the base part of the nozzle portion 1b of the process vessel 1. Further, in the socket part 82a, the seal stage part 1d is contacted and pressed to a seal ring 85. The cutter nozzle 84 is set up at a position opposite to the top of the nozzle portion 1b of the process vessel 1. The seal opening unit 82 is connected to a gas-liquid separation vessel 88 via a pipe 86 through a pressure reducing valve 87.

The separated harmless gas, such as carbon dioxide gas, nitrogen gas, etc., in the gas-liquid separation vessel 88 is discharged to the air through a pipe 89 and a valve 90, and liquid 91, including the solid material, such as arsenic, flows down into a neutralization processing unit 93.

Liquid 96 contained in the neutralization processing unit 93 is neutralized by a neutralizer (alkaline solution)fed from a neutralizer container 95 connected to the neutralization processing unit 93 via a pipe 94. The neutralized liquid is discharged through the pipe 97 and a valve 98, and is abandoned. The solid material with a part of the liquid 96 is withdrawn and flows down into a heavy metal magnetizing process unit 100 through a pipe 99. Into the pipe 99, neutralizer is fed from the neutralizer container 95, and ferrous salt is also fed from a ferrous salt container 101.

To the heavy metal magnetizing process unit 100, air is supplied from an air feeding pump 102 through a pipe 103, and heavy metal is changed to an iron eutectic alloy (arsenic-iron eutectic). From the heavy metal magnetizing process unit 100, the iron eutectic alloy of heavy metal with a part of the liquid is drained to a magnetic separation unit 105 through a pipe 104, and the remaining liquid is discharged through a pipe 106 and a valve 107, and is disposed of. Into an intermediate part of the pipe 106 (part down stream of the valve 107), neutralizer is fed from the neutralizer container 108, and neutralized liquid is discharged from the pipe 106.

The magnetic separation unit 105 separates off the arsenic-iron eutectic by using a magnetic separation mechanism, and discharges the separated arsenic-iron eutectic from a pipe 109, the remaining liquid is then sent into the intermediate part of the pipe 106 (part between the valve 107 and the position at which neutralizer is fed through a pipe 110.

If the predetermined amounts of neutralizer (alkaline solution), oxygen and ferrous salt, are enclosed in the process vessel 1 in advance, and oxidation processing is performed at a high-temperature and in a high-pressure state, followed by the process vessel 1 being cooled down, heavy metal separated in the oxidation processing can be changed to an iron eutectic alloy. Therefore, it is possible to simplify the oxidation processing apparatus by omitting the heavy metal magnetizing process unit 100, the ferrous salt container 101, the air feeding pump 102, the pipe 103 and the valve 107. Supplying a neutralizer (alkaline solution) and ferrous salt to the process vessel 1 can be easily carried out bymixing the above-mentioned material in the hydrogen peroxide aqueous solution in advance, similar to the supply of Zn powder to the process vessel 1.

Figure 5:
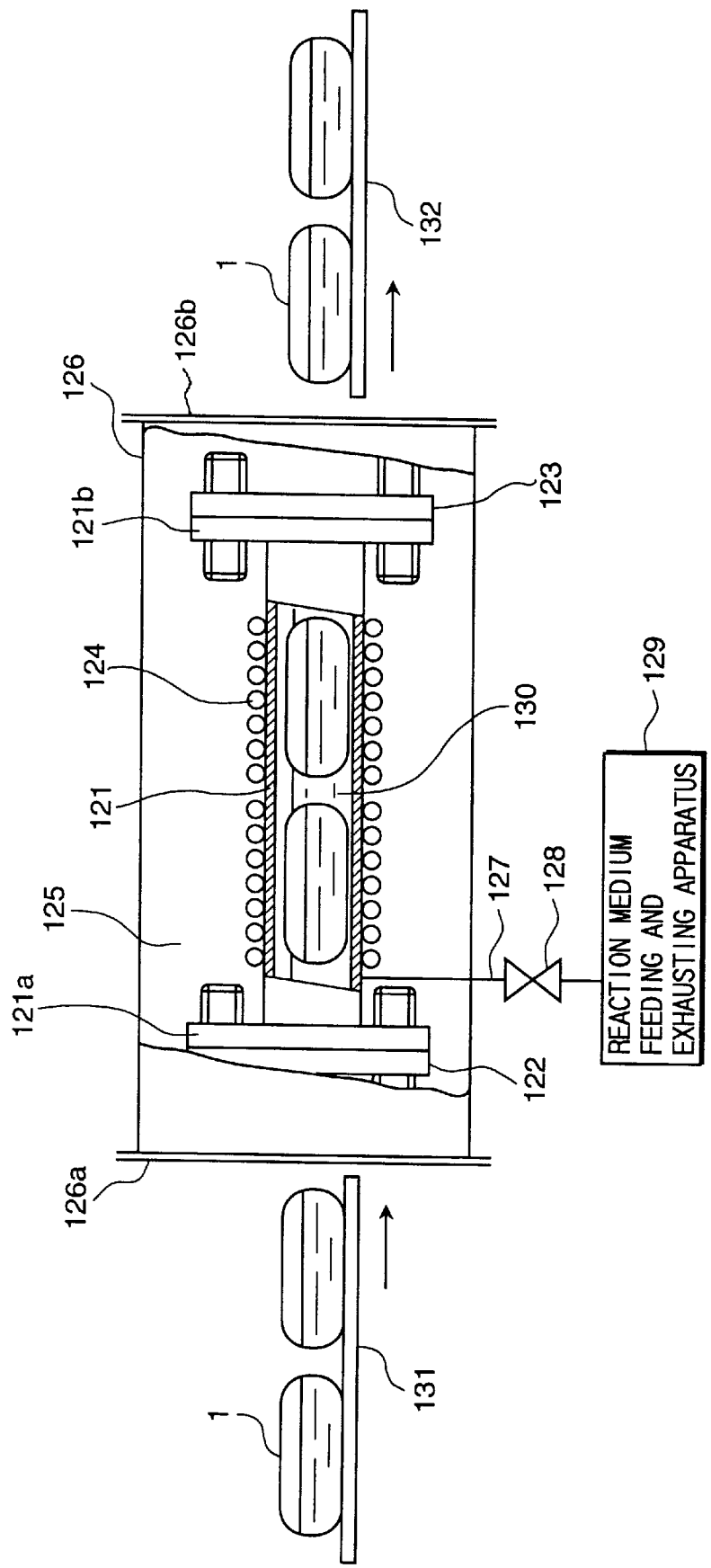
FIG. 5 is a partial vertical section of a deformation example of a reaction processing part in the oxidation processing apparatus according to the present invention, which is suitable for performing oxidation processing for a plurality of process vessels.

FIG. 5 shows a modification of a reaction processing part suitable to perform oxidation processing of substances to be processed and the hydrogen peroxide aqueous solution, which are enclosed in a plurality of process vessels, in a conveyer type system.

The second vessel of an autoclave 121 is formed to have an oblong shape. Further, closing flanges 122 and 123 are installed at opening flange parts 121a and 121b provided at side terminals of the autoclave 121 so that the side terminals are easily opened and closed. Moreover, a heating tube 124 for circulating a heat carrier is provided closely on the outer surface of a trunk part of the autoclave 121.

The outside of the autoclave 121 is covered with a layer 125 of heat insulation material and absorbent material, and the autoclave 121 covered with the layer 125 is further contained in a protection container 126. Furthermore, opening/closing lids 126a and 126b which can be easily opened and closed are installed at both ends of the protection container. During the opening period of the opening/closing lids 126a and 126b, the closing flanges 122 and 123 for sealing both ends of the autoclave 121 are set to a releasable state, and during the closing period, the protection container 126 is sealed so as to be air tight.

Although not shown in the figure, the autoclave 121 is provided with an oxygen feeding apparatus and a temperature control apparatus, and as for the protection container 128 is provided with an exhausting apparatus, similar to the previously-explained embodiment.

The body of the autoclave 121 is connected to a reaction medium feeding and exhausting apparatus 129 through a pipe 127 and a valve 128, which apparatus 129 performs feeding and exhausting of reaction medium 130 (pure water).

A conveying apparatus 131 is set so as to carry a plurality of process vessels 1 into the autoclave 121 through the opening flange part 121a of the autoclave 121, and a conveying apparatus 132 is set so as to take out and carry a plurality of process vessels 1 from the autoclave 121 through the opening flange part 121b of the autoclave 121.

The carrying-in of process vessels 1 to the autoclave 121 is performed after reaction medium 130 in the autoclave 121 is discharged through the pipe 127 and the valve 128. At first, the opening/closing lid 126a of the protection container 126 is opened. Next, the closing flange 122, is released and a plurality of process vessels 1 set on the conveying apparatus 131 are carried into the autoclave 121. Then, the autoclave 121 is sealed up by closing the closing flange 122, and the protection container 126 is also sealed up by closing the opening/closing lid 126a.

Before the start of the oxidation processing, a predetermined amount of reaction medium (pure water) 130 is fed to the autoclave 121 from the reaction medium feeding and exhausting apparatus 129 through the pipe 127 and the valve 128. Further, the autoclave 121 is heated by circulating a heat carrier (oil) in the heating tube 124, and oxidation processing is performed at a high-temperature and high-pressure state, similar to the previously-explained embodiment.

The carrying-out of process vessels 1 from the autoclave 121 is performed after the reaction medium 130 in the autoclave 121 is discharged through the pipe 127 and the valve 128. At first, the opening/closing lid 126b of the protection container 126 is opened. Next, the closing flange 123 is released, and a plurality of process vessels 1 in the autoclave 121 are carried out and set on the conveying apparatus 132. Further, the autoclave 121 is sealed up by closing the closing flange 123, and the protection container 126 is also sealed up by closing the opening/closing lid 126b.

In the case of continuously performing the carrying-in of process vessels 1 to and the carrying-out of process vessels 1 from the autoclave 121, opening and closing of the protection container 126 and the autoclave 121 is conducted simultaneously at both ends. Thus, after the process vessels 1 for which oxidation processing was performed are carried out from the autoclave 121, new process vessels 1 can be carried into the autoclave 121.

In the above-mentioned two embodiments, a process vessel(s) 1 is dealt with by using a single autoclave 4 or 121. However, it is possible to provide a plurality of autoclaves of a type 4 or a type 121 and to operate them in parallel. In operating a plurality of autoclaves, such as 4 or 121, in parallel, time differences among operational modes of the plurality of autoclaves are set. That is, when some of the autoclaves are cooled, the heat of the high temperature heat carrier in the heating tubes for the autoclaves to be cooled is transferred to heat carrier in heating tubes for other autoclaves the be heated, for heating the autoclaves. On the other hand, a low temperature heat carrier in the heating tubes for the autoclaves which were cooled is sent to heating tubes for other autoclaves to be cooled, for cooling the autoclaves. In accordance with the above-mentioned method of circulating oil (heat carrier), the consumption of energy necessary for heating and cooling can be reduced.

The oxidation processing method and apparatus according to the present invention can deal with abandoned medical equipment, equipment parts and instruments, carcasses of animals and plants used for tests, residuals in processed industrial waste, in which dangerous substances are mixed, or adhere to. If such articles are to be dealt with, since they are solid, the process vessel 1 is produced so as to have a wide aperture part, and the aperture part is opened and closed by using a threaded lid.

In accordance with the present invention, since oxidation processing of substances to be processed can be performed at a high-temperature and in a high-pressure state, for example, a supercritical state, in a space doubly contained and isolated by the first vessel (process vessel) and the second vessel (autoclave), it is possible to prevent dangerous substances to be processed from leaking to the outside of the processing apparatus.

Furthermore, since it is not necessary to clean the inner wall of the second vessel (autoclave), the operational efficiency of the oxidation processing method and apparatus is improved.

What is claimed is:

1. A method of performing oxidation processing of substances to be processed, by sealing up and heating a vessel in which said substances, oxygen and a reaction medium are enclosed, said method comprising the steps of:

enclosing said substances to be processed, oxygen and a first reaction medium in a first vessel and sealing up said first vessel;

enclosing said first vessel in a second vessel and sealing up said second vessel; and indirectly heating said substances to be processed, oxygen and said first reaction medium in said first vessel by heating said second vessel so that oxidation processing of said substances is performed.

2. An oxidation processing method according to claim 1, wherein said first reaction medium enclosed in said first vessel is heated to a supercritical state.

3. An oxidation processing method according to claim 1 or claim 2, wherein, if said substances enclosed in said first vessel leak to the inside of said second vessel, said leaking substances are oxidized by feeding oxygen into said second vessel.

4. An oxidation processing method according to claim 1, wherein the step of enclosing said substances to be processed, oxygen and a first reaction medium in a first vessel and sealing up said first vessel is executed inside an isolation container.

5. An oxidation processing method according to claim 4, wherein after oxidation processing of said substances enclosed in said first vessel, which is enclosed in second vessel, has been performed, said first vessel is taken out from said second vessel, and said processed substances are withdrawn, by opening said first vessel, and are abandoned.

6. An oxidation processing method according to claim 4 or claim 5, wherein, via a nozzle part formed at said first vessel, said substances to be processed, oxygen and said first reaction medium are inserted into said first vessel, and then said first vessel is sealed up, and after the oxidation processing, said nozzle part of first vessel is opened, and said processed substances are withdrawn.

7. An oxidation processing method according to one of claim 1, claim 2, claim 4 and claim 5, wherein pressure in said second vessel is adjusted by injecting inert gas into said second vessel.

8. An oxidation processing method according to one of claim 1, claim 2, claim 4 and claim 5, wherein material to react on hydrofluoric acid and change hydrofluoric acid to a stable compound is 10 enclosed in said first vessel together with said substances, oxygen and said reaction medium.

9. An oxidation processing method according to one of claim 1, claim 2, claim 4 and claim 5, wherein neutralizer and ferrous salt are enclosed in said first vessel together with said substances, oxygen and said reaction medium.

10. An oxidation processing method according to claim 1, wherein the first and second vessels are independently sealed.

11. An oxidation processing method according to claim 1, wherein the first and second vessels are separate such that there is no flow path communicating from inside said first vessel to inside said second vessel.

12. A method of performing oxidation processing of substances to be processed, by sealing up and heating a vessel in which said substances, oxygen and a reaction medium are enclosed, said method comprising the steps of:
   (a) enclosing said substances to be processed, oxygen and a first reaction medium in a first vessel and sealing up said first vessel;
   (b) enclosing said first vessel in a second vessel and sealing up said second vessel;
   (c) indirectly heating said substances to be processed, oxygen and said reaction medium in said first vessel by heating said second vessel so that oxidation processing of said substances is performed;
   (d) taking out said first vessel from said second vessel after oxidation processing of said substances enclosed in said first vessel is completed;
   (e) withdrawing said processed substances from said first vessel by opening said first vessel; and
   repeating step (a) to step (e) at preset times.

13. An oxidation processing method according to claim 2, wherein said first vessel is thrown away after step (e), and a new first vessel is used at the next step (a).

14. An oxidation processing method according to claim 12, wherein the first and second vessels are independently sealed.

15. An oxidation processing method according to claim 11, wherein the first and second vessels are separate such that there is no flow path communicating from inside said first vessel to inside said second vessel.

16. An oxidation processing method according to claim 1 or 11, wherein the substances to be processed are organic materials to be processed.

17. An oxidation processing method according to claim 1 or 12, wherein the substances to be processed are dangerous organic materials to be processed.

* * * * *